June 1, 1965
R. E. RADFORD
3,186,429
SUPPLY AND EXHAUST VALVE
Original Filed Aug. 15, 1960
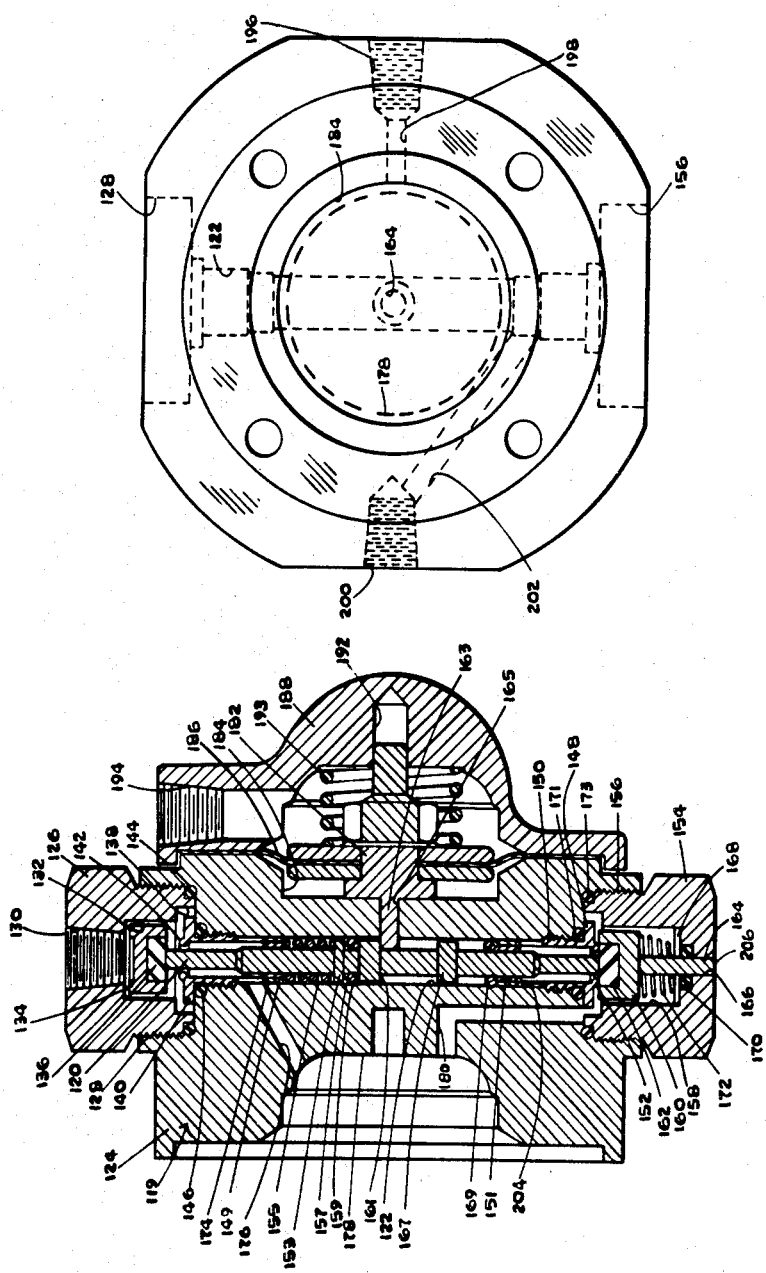
Inventor
Robert E. Radford
By William S. Dorman
Attorney

United States Patent Office 3,186,429
Patented June 1, 1965

3,186,429
SUPPLY AND EXHAUST VALVE
Robert E. Radford, Tulsa, Okla., assignor to Oil Capital Valve Company, Tulsa, Okla., a corporation of Oklahoma
Original application Aug. 15, 1960, Ser. No. 49,576, now Patent No. 3,081,790, dated Mar. 19, 1963. Divided and this application Nov. 14, 1962, Ser. No. 245,339
3 Claims. (Cl. 137—463)

This invention relates to improvements in valves, and more particularly, but not by way of limitation, to a valve for shunting the flow of a fluid to control a fluid flow system. This is a divisional application of my copending application, Serial No. 49,576, filed August 15, 1960, now Patent Number 3,081,790.

It is frequently desirable to control the flow of fluid in a fluid flow system to provide for an efficient treating of the fluid, or for an efficient operation of the entire system. For example, in the oil production industry, the well fluid is normally directed through a plurality of treating operations prior to the delivery thereof to a consumer. The well stream is usually directed through a separator apparatus wherein it is important to maintain the liquid level or the interface level at a pre-determined position therein. During the treating of the well stream, the fluid is normally moved through a filter apparatus for removal of undesirable particles therefrom, and the filter members frequently become clogged whereby the fluid pressure may build up sufficiently for rupturing the filter member. When this occurs, the well fluid may move into the remaining portions or steps of the treating operation through a ruptured filter, or may be delivered for refining, or the like, after by-passing the filtering process, thus resulting in an unfiltered fluid being mixed with the treated fluid, which is highly undesirable.

The present invention contemplates a novel valve for automatically shunting the fluid in a fluid flow system for intermittently exhausting the fluid to atmosphere, or altering the direction of flow thereof in accordance with the desired control conditions, thus maintaining an efficient control of the entire system. The control valve is provided with a reciprocal valve stem providing multiple valve ports for shunting the flow of the fluid therethrough in response to variable operating conditions of the system. In order to maintain a substantially constant fluid level within a vessel, or the like, the valve stem is reciprocated in accordance with variations of the fluid level for alternately supplying the vessel with fluid or exhausting the fluid therefrom, as required. When it is desired to control the flow of fluid through a system in response to pressure increases, the valve may be adapted for reciprocation of the stem in response to the pressure increases for exhausting the fluid to atmosphere, or otherwise diverting the flow thereof, as desired.

It is an important object of this invention to provide a valve for automatically controlling the flow of a fluid in a flow system.

It is another object of this invention to provide a novel control valve responsive to variable conditions in a fluid flow system for automatically shunting the flow of the fluid therethrough.

Another object of this invention is to provide a novel valve having multiple valve ports alternately opened and closed by a common valve stem.

Still another object of this invention is to provide a control valve for automatically diverting the flow of a fluid therethrough for alternately opening and closing remotely disposed valves.

A further object of this invention is to provide a novel control valve for automatically interrupting the flow of fluid in a fluid flow system whereby the fluid will not move through the system under adverse conditions therefor, thus assuring that undesirable fluid will not be delivered for ultimate utilization thereof.

A still further object of this invention is to provide a novel control valve which is simple and efficient in operation and economical and durable in construction.

Other objects and advantages of the invention will be evident from the following detailed description, read in conjunction with the accompanying drawings, which illustrate my invention.

In the drawings:
FIGURE 1 is a sectional elevational view of a modified form of the valve.
FIGURE 2 is an elevational view of the housing of the modified form of the invention depicted in FIG. 1 and taken at right angles therefrom.

Referring to the drawings in detail, reference character 119 generally indicates a valve having a valve stem arrangement substantially identical with that disclosed in my aforementioned Patent No. 3,081,790. The difference in the valve of the present invention resides in the application or environment thereof.

The valve stem 120 is substantially identical with the valve stem 56 depicted in the previous Patent No. 3,081,790. However, the stem 120 as disclosed herein is not provided with a longitudinally extending central bore, such as the bore 68 of the said valve stem 56, but it is to be understood that such a bore could be provided, if desired. The stem 120 is reciprocally disposed within a bore 122 of a housing or body 124. A nut or sleeve 126 is threadedly secured at 128 to the body 124 and is provided with a central threaded bore 130 for connection with a suitable pilot valve, or the like (not shown), for a purpose as will be hereinafter set forth. The bore 130 is enlarged at 132 to provide a pocket or recess for receiving a seat retainer member 134. The retainer member 134 is similar to to the retainer members 38 and 50 shown in Patent No. 3,081,790, and carries a valve seat 136 therein for cooperation with the valve stem 120, as will be hereinafter set forth.

The bore 132 is further enlarged at 138 to provide a fluid chamber surrounding a bushing 140 which is threadedly secured within the bore 122. The bushing 140 is similar to the bushing 23 of the said Patent No. 3,081,790, and is provided with a central valve port 142 in substantial alignment with the valve seat 136. A suitable sealing ring 144 is interposed between the sleeve 126 and the body 124 to preclude leakage of fluid therebetween, and a similar sealing member 146 is interposed between the bushing 140 and the bore 122 for precluding leakage of fluid, as is well known.

A second bushing 148 is threadedly secured at 150 to the opposite end of the bore 122 and is provided with a central valve port 152. A cap or sleeve member 154 is threadedly secured at 156 to the body 124 and is provided with a central bore 158 for receiving a valve seat retainer member 160 therein similar to the retainer member 50. The retainer member 160 is reciprocally disposed within the recess or bore 158 and carries a valve seat 162 therein for cooperation with the valve port 152. A rod member 164 is carried by the retainer member 160 and extends longitudinally therefrom through a reduced bore 166 provided in the cap member 154. A washer member 168 is disposed in the recess 158 around the rod 164 for retaining a sealing ring 170 around the rod for precluding leakage of fluid. A suitable spring 172 having one end anchored on the washer 168 and the opposite end anchored against the retainer member 160 is disposed in the bore 158 for constantly urging the retainer member 160 and valve seat 162 upwardly or in a direction toward the valve port 152.

The valve stem 120 extends through the bore 122 and the bushing members 140 and 148 as clearly shown in FIG. 1, and is normally maintained in a substantially raised position by the action of the spring 172 bearing against the retainer member 160 and the valve seat 162 bearing against the stem 120. Thus, the valve seat 136 is normally raised with respect to the valve port 142 for a purpose as will be hereinafter set forth. A spacer ring 149 is disposed around the stem 120 adjacent the lower end of the bushing 140 for guiding the reciprocal movement of the stem 120. A similar spacer ring 151 is disposed around the stem 120 in the proximity of the upper end of the bushing 148 for facilitating the guiding of the reciprocal movement of the stem.

An outwardly directed shoulder 153 is provided on the stem 120 spaced below the ring 151 for receiving one end of a spring 155. The opposite end of the spring 155 is anchored on either the ring 149 or the lower end of the bushing 140 for constantly urging the stem 120 downward or in a direction away from the bushing 140. A suitable sealing ring 157 is disposed around the stem 120 below the shoulder 153 for precluding leakage of fluid therearound, and is supported on a second annular shoulder or flange 159 spaced below the shoulder 153. An oppositely disposed shoulder 161 cooperates with a slidable pin 163 which extends through a transverse bore 165 in the housing 124 for maintaining the stem 120 in the normal raised position against the action of the spring 155, as depicted in FIG. 1. A lower land member or outwardly directed flange 167 is spaced below the shoulder 161 of the stem 120 to provide a chamber therebelow for housing a sealing ring 169 for precluding leakage of fluid. It will be apparent that suitable sealing members 171 and 173 are interposed between the body 124 and the bushing 148 and sleeve 154, respectively, as is well known, for precluding leakage of fluid therebetween.

A plurality of circumferentially spaced apertures 174 are provided in the bushing 140 in substantial alignment with an angularly disposed bore or passageway 176 provided in the body 124. The bore 176 extends into communication with an enlarged recess 178 which, as depicted herein, normally receives a diaphragm actuated valve (not shown) of the flow system being controlled. The diaphragm actuated valve in the present instance is preferably a pressure opening main valve in the flow system for supplying the fluid thereto. The diaphragm (not shown) of said valve closes the recess 178 whereby any fluid moving through the bore 176 cannot escape therefrom, and is therefore directed into an angled passageway 180 which extends through the body 124 into communication with the interior of the cap member 154. It will be apparent that the passageways 176 and 180 may be interconnected in any suitable manner to provide a closed communication between the interior of the bushing 140 and the interior of the cap member 154, and there is no intention to limit the structure to the recess 178 therebetween. Thus, any fluid entering the bore 130 will be transmitted through the normally open valve port 142 and through the passageways 176 and 180 into the bore 158 of the cap member 154. Since the valve port 152 is normally closed, the fluid will be trapped in the passageways 176 and 180 and the recess 178, and in the present instance will provide a pressure in the chamber 178 acting on the diaphragm of the pressure opening valve for maintaining said valve in an open position for supplying fluid to the flow system.

The reciprocal or slidable pin 163 is carried by or may be integral with a flanged boss member 182 which is disposed in a recess 184 provided in the housing 124. A diaphragm 186 is suitably carried by the boss 182 and is clamped to the housing 124 in any well known manner by a ball housing 188 which may be bolted or the like thereto. The outer end 190 of the boss 182 is reduced in diameter and is slidably disposed in a bore 192 provided in the housing 188. A spring member 193 is disposed within the housing 188 around the boss member 182 and functions to constantly urge the diaphragm 186 in a left hand direction, or toward the housing 124 for maintaining the pin 163 in engagement with the shoulder 161. A threaded bore 194 is provided in the bell housing 188 and is preferably in communication with the down stream fluid pressure of the fluid flow system, such as below the separator apparatus (not shown). This provides a fluid pressure on the right hand side of the diaphragm 186, as viewed in FIG. 1, equal to the pressure on the down stream side of the separator apparatus. It will be apparent that the working conditions may be modified in accordance with the type of flow system being controlled, and in no manner is the invention limited to utilization of a fluid flow system in the treating a well stream.

Referring to FIG. 2, a threaded bore 196 extends transversely in the housing 124 into communication with a passageway 198 which extends into the chamber or bore 184 at the left hand side of the diaphragm 186, as viewed in FIG. 1. The bore 196 is preferably in communication with the up stream fluid pressure of the flow stream, which is normally substantially equal to the down stream fluid pressure. Thus, the fluid pressures normally acting on the diaphragm 186 are equalized whereby the pressure of the spring 193 maintains the diaphragm 186 flexed in a left hand direction as shown in FIG. 1.

A threaded bore 200 is oppositely disposed from the bore 196 in the housing 124 and is in communication with the bore 122 through an angular passageway 202. The bushing 148 (FIG. 1) is provided with a plurality of circumferentially spaced apertures 204 in substantial alignment with the passageway 202. The port or bore 200 is preferably an exhaust port and functions for relieving the fluid pressure in the passageways 176 and 180 and the chamber 178 when an undesirable pressure differential exists. The relieving of the pressure in the chamber 178 will close the main valve (not shown) for stopping the flow of fluid through the system, as will be hereinafter set forth in detail.

*Operation*

When it is desired to automatically shut off the flow of a fluid into a flow system when an undesirable pressure build up occurs within the system, such as when a filter member (not shown) has become clogged, or the like, the valve 119 may be interposed in the flow system whereby a portion of the fluid is directed through a remote valve, such as a pilot valve (not shown), which is in communication with the bore 130 of the housing 124. The fluid moving through the bore 130 is transmitted through the open valve port 142 and through the passageway 176 into the chamber 178, from where the fluid moves through the bore 180 into the interior of the cap member 154. The valve port 152 is normally closed by the pressure of the spring 172 urging the valve seat 162 thereagainst. Thus, the fluid cannot escape from the chamber 178 and the passageways 176 and 180. The pressure is retained in the chamber 178 for maintaining the main valve (not shown) in an open position whereby the fluid flows into the flow system without interruption.

When the pressure on the up stream side of the flow system, such as ahead of the filter or separator apparatus, increases sufficiently, the pressure on the left hand side of the diaphragm 186 will become simultaneously increased for overcoming the action of the spring 193. It will be apparent that the pressure of the spring 193 may be so selected as to provide for substantially any desired pressure increase for overcoming the action thereof. The diaphragm 186 will be flexed in a right hand direction (not shown) by the increased pressure in the chamber 184, carrying the boss 182 and pin 163 in a right hand direction. This moves the pin 163 away from the shoulder 161 whereby the spring 155 will snap the valve stem 120 downwardly in the bore 122. This downward movement of the stem 120 moves the valve seat 162 and the valve seat retainer member 160 against the action of the spring 172 and opens the valve port 152. The fluid in the interior of the cap member 154 will then flow through the open valve port 152 for discharge through the apertures 204 and will be exhausted through the passageway 202 and port 200. The exhausted fluid may be directed to a sump, or exhausted to atmosphere, as desired.

The valve seat 136 and retainer member 134 will move downwardly upon a downward movement of the valve stem 120 in combination with the opening of the valve port 152. The release of the fluid from the passageway 176 will decrease the pressure below the valve seat 136 whereby the pressure acting on the top thereof will close the valve seat 136 against the valve port 142. It will be apparent that a spring (not shown) may be provided above the retainer member 134 similar to that depicted in the preferred embodiment, if desired, for facilitating the closing of the valve port 142.

With the closing of the upper valve port 142 substantially simultaneously with the opening of the lower valve port 152, the pressure is exhausted from the chamber 178 and no fluid may enter the chamber for a recharging thereof. Thus, the pressure is relieved on the main valve (not shown) of the flow system whereby the main valve will close for stopping the supply of fluid to the flow system. This precludes the possibility of a continued fluid pressure increase at the filter unit, thus substantially eliminating the possibility of an accidental rupturing of the filter with the attendant disadvantages thereof. In addition, the fluid cannot continue to flow through the system and by-pass a filter which may rupture.

As the retainer member 160 moves downwardly, the stem or rod 164 is moved downwardly therewith whereby the outer end 206 thereof will protrude from the cap member 154. This provides a visual observance of the position of the valve stem 120 within the bore 122, and an operator or attendant will immediately know that an undesirable pressure build up has occurred in the flow system, and the cause may be found and corrected. When the flow system or pressure conditions therein have been restored to normal, the valve 119 may be reset by a manual upward pressure on the end 206 of the rod 164. The pressure on the rod 164 will raise the retainer member 160 and the valve stem 120 whereby the pin 163 may once again contact the shoulder 161. The balanced condition of the pressure in the flow system will balance the pressures on the diaphragm 186 whereby the spring 193 will urge the pin 163 in a direction toward the stem 120, and with the raising of the stem 120, the pin 163 will snap into engagement with the shoulder for maintaining the stem in the elevated position.

The upward movement of the stem 120 opens the valve port 142 and permits the spring 172 to urge the valve seat 162 against the valve port 152 for a closing thereof. The fluid may thus flow through the open port 142 and into the chamber 178 for a recharging thereof whereby the main valve will be reopened for continuing the flow of fluid into the flow system.

By way of summary of the structure, the valve 119 is normally open whereby the chamber 178 is charged with fluid pressure in order to maintain the main valve (not shown) of the flow system open to supply the fluid to the system. In the event of an undesirable pressure build up in the system, the diaphragm 186 will be flexed in a right hand direction for releasing the pin 163 from the shoulder 161 in order that the spring 155 will move the valve stem 120 downwardly for opening of the valve port 152, and permitting the valve port 142 to be closed. The fluid in the chamber 178 is exhausted through the open valve port 152 whereby the main valve will automatically be closed for stopping the flow of fluid to the flow system. Thus, an automatic control is provided for shutting off the flow of fluid under adverse pressure conditions. The valve 119 may be reset when the normal conditions are restored to the flow system for re-opening the main valve to supply the fluid in the flow system.

From the foregoing, it will be apparent that the present invention provides a novel reciprocating valve wherein a single valve stem functions for alternately opening and closing a plurality of valves in order to shunt the flow of a fluid in a fluid flow system. The novel valve provides an automatic control of the flow of the fluid in order to maintain a normal or desirable condition in the system. The novel valve may be utilized for controlling the level of a fluid within a vessel, or for controlling the operation of the system under desired pressure conditions. The valve is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A valve comprising a housing, a valve stem reciprocally disposed within the housing, a valve port provided at each end of the valve stem, a valve seat provided for each valve port for cooperating with the valve stem to alternately open and close the valve ports, a fluid inlet provided in the housing, a fluid outlet provided in the housing, said valve stem cooperating with one of said valve seats for normally opening one of said valve ports to provide communication between the fluid inlet and the other of said valve ports, means responsive to pressure differentials for automatically moving the valve stem in one direction for closing the first of said valve ports and opening the second of said valve ports whereby communication is provided between the first of said ports and the fluid outlet for exhausting the fluid from the valve, said first valve port being closed to preclude flow of fluid through the valve inlet when the said second valve port is opened, and manual reset means for moving the valve stem in an opposite direction for opening the first of said valve ports and closing the second of said valve ports.

2. A valve adapted to be interposed in a fluid flow system for controlling the flow of the fluid, and comprising a housing, a bore extending through the housing and having the opposite ends thereof open, a valve stem reciprocally disposed within the bore, a valve port secured in the opposite ends of the bore, passageway means provided in the housing for communication between said valve ports, a valve seat disposed at the opposite ends of the valve stem for cooperation therewith for alternate opening and closing of the valve ports, a fluid inlet, a fluid outlet, means responsive to variable pressure conditions within the flow system for moving the valve stem in one direction to exhaust fluid through the fluid outlet, one of said valve ports being closed to preclude flow of fluid into the valve during exhausting of the fluid, and manual reset means for moving the valve stem in an opposite direction for restoring flow of fluid to the valve through the fluid inlet and ceasing the exhaust of fluid through the fluid outlet.

3. A valve adapted to be interposed in a fluid flow system for controlling the flow of the fluid, and comprising a housing, a bore extending through the housing and having the opposite ends thereof open, a valve stem reciprocally disposed within the bore, a valve port secured in the opposite ends of the bore, passageway means provided in the housing for communication between said valve ports, a valve seat disposed at the opposite ends of the valve stem for cooperation therewith for alternate opening and closing of the valve ports, a fluid inlet in communication with the first of said valve ports, a fluid outlet in communication with the second of said valve ports, said valve stem normally in a position for opening the first of said valve ports and closing of the second of said valve ports whereby fluid will be trapped within the housing, means responsive to variable pressure conditions within the flow system for moving the valve stem in one direction for closing the first of said valve ports and opening the second of said valve ports whereby the trapped fluid will be exhausted through the fluid outlet, and manual reset means for moving the valve stem in an opposite direction for restoring the normal position therefor.

References Cited by the Examiner

UNITED STATES PATENTS

| | | | |
|---|---|---|---|
| 2,837,117 | 6/58 | Ruhl | 137—624.27 |
| 2,859,735 | 11/58 | Di Tirro | 137—624.27 X |
| 3,045,703 | 7/62 | Alfieri | 137—627.5 |
| 3,073,619 | 1/63 | Manning | 137—627.5 XR |
| 3,098,500 | 7/63 | Gruber | 137—556 XR |

FOREIGN PATENTS 1,054,856  4/59  Germany.

WILLIAM F. O'DEA, *Primary Examiner.*

ISADOR WEIL, *Examiner.*